(12) United States Patent
Kang et al.

(10) Patent No.: US 12,339,743 B2
(45) Date of Patent: Jun. 24, 2025

(54) ECC DECODER AND MEMORY CONTROLLER INCLUDING THE SAME

(71) Applicant: Samsung Electronics Co., Ltd., Suwon-si (KR)

(72) Inventors: Soonyoung Kang, Suwon-si (KR); Yongsung Kil, Suwon-si (KR); Jaehong Kim, Suwon-si (KR); Hongrak Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/495,156

(22) Filed: Oct. 26, 2023

(65) Prior Publication Data

US 2024/0143442 A1    May 2, 2024

(30) Foreign Application Priority Data

Oct. 27, 2022 (KR) .......................... 10-2022-0140503

(51) Int. Cl.
*G06F 11/10* (2006.01)
*G06F 11/07* (2006.01)

(52) U.S. Cl.
CPC ...... *G06F 11/1068* (2013.01); *G06F 11/0772* (2013.01); *G06F 11/1048* (2013.01)

(58) Field of Classification Search
CPC ............. G06F 11/1068; G06F 11/0772; G06F 11/1048
See application file for complete search history.

(56) References Cited

U.S. PATENT DOCUMENTS

| | | | |
|---|---|---|---|
| 8,281,219 B2 | 10/2012 | Parris et al. | |
| 8,464,137 B2 | 6/2013 | Franceschini et al. | |
| 9,250,990 B2 | 2/2016 | Motwani et al. | |
| 9,905,289 B1 | 2/2018 | Jeon et al. | |
| 10,043,575 B2 | 8/2018 | Pignatelli et al. | |
| 2009/0319859 A1* | 12/2009 | Alrod .................. | G06F 11/1068 714/752 |

(Continued)

FOREIGN PATENT DOCUMENTS

EP    4361814 A1 *    5/2024    .......... G06F 11/0772

OTHER PUBLICATIONS

Extended European Search Report corresponding to European Patent Application No. 23206443.6 (7 pages) (dated Mar. 18, 2024).

*Primary Examiner* — Samir W Rizk

(74) *Attorney, Agent, or Firm* — MORGAN, LEWIS & BOCKIUS LLP

(57) ABSTRACT

A memory controller includes a processor, which is configured to determine one of a first operation mode and a second operation mode as an operation mode based on a lifespan or retention of a memory device. The processor is configured to transmit to the memory device, a read command for obtaining hard decision (HD) data and a first piece of SD data during a time period of a single read, or a read command for obtaining a second piece of SD data from a plurality of reads. A decoding circuit is configured to perform iterative decoding based on the first piece of SD data or the second piece of SD data. The first operation mode is for sequentially transmitting the coarse SD read command and the fine SD read command to the memory device, whereas the second operation mode is for transmitting the fine SD read command.

20 Claims, 10 Drawing Sheets

(56) References Cited

U.S. PATENT DOCUMENTS

| | | | |
|---|---|---|---|
| 2014/0233322 A1 | 8/2014 | Wu et al. | |
| 2016/0246673 A1 | 8/2016 | Kim | |
| 2016/0378595 A1* | 12/2016 | Rho | G06F 11/1048 |
| | | | 714/764 |
| 2016/0378596 A1* | 12/2016 | Kim | H03M 13/45 |
| | | | 714/755 |
| 2021/0075446 A1* | 3/2021 | Zhang | G06F 11/1012 |

* cited by examiner

ECC DECODER AND MEMORY CONTROLLER INCLUDING THE SAME

REFERENCE TO PRIORITY APPLICATION

This application claims priority under 35 U.S.C. § 119 to Korean Patent Application No. 10-2022-0140503, filed Oct. 27, 2022, the disclosure of which is hereby incorporated herein by reference.

BACKGROUND

The inventive concept relates to an error correction code (ECC) decoder and a memory controller including the ECC decoder and, more particularly, to an ECC decoder configured to preemptively perform decoding based on soft decision (SD) data, and a memory controller including the ECC decoder.

Non-volatile memory devices, which are a type of memory device, include a plurality of memory cells for storing data. Flash memory devices, which are a typical type of non-volatile memory device, may be used in cellular phones, digital cameras, personal digital assistants (PDAs), mobile computer devices, stationary computer devices, and other devices.

Along with the development of semiconductor manufacturing technology, the degree of integration and capacity of memory devices are increasing continually. However, the scale-down of storage devices realized by highly-integrated memory devices may increase errors in stored data. Error correction codes (ECC) have been used to correct errors in data. However, an ECC may cause problems such as requiring a large memory space for storing parity data for error correction or requiring a long time for error correction operations to be performed. For example, an ECC using only hard decision (HD) values has reached its correction ability limit, whereas an ECC using soft decision (SD) values requires a long time because of the necessity for performing a plurality of read operations (i.e., reads).

SUMMARY

The inventive concept provides an error correction code (ECC) decoder and a memory controller that employ a coarse SD read command, by which both hard decision (HD) data and soft decision (SD) data are obtainable, to preemptively perform decoding based on SD data before performing a plurality of reads.

According to an embodiment of the invention, a memory controller is provided that includes a processor having a decoding-mode determination circuit therein. This decoding-mode determination circuit is configured to: (i) receive information on a lifespan or retention of a memory device, and (ii) based on the received information, determine one of a first operation mode and a second operation mode as an operation mode. The processor is configured to transmit to the memory device, a coarse soft decision (SD) read command for obtaining hard decision (HD) data and a first piece of SD data during a time period of a single read, or a fine SD read command for obtaining a second piece of SD data from a plurality of reads. An error correction code (ECC) decoder is also provided, which includes: (i) a coarse SD setting circuit configured to store a parameter value of a decoding operation, which is based on the first piece of SD data obtained by the coarse SD read command, (ii) a fine SD setting circuit configured to store a parameter value of a decoding operation, which is based on the second piece of SD data obtained by the fine SD read command, and (iii) a decoding circuit configured to perform iterative decoding based on the first piece of SD data or the second piece of SD data. According to some of these embodiments, the first operation mode corresponds to a mode for sequentially transmitting the coarse SD read command and the fine SD read command to the memory device, whereas the second operation mode corresponds to a mode for transmitting the fine SD read command to the memory device.

According to another embodiment of the invention, an ECC decoder is provided, which includes: (i) a coarse SD setting circuit storing a parameter value of a decoding operation that is based on a first piece of SD data obtained by a coarse SD read command, (ii) a fine SD setting circuit storing a parameter value of a decoding operation that is based on a second piece of SD data obtained by a fine SD read command, (iii) a mode selection circuit configured to receive a control signal indicating an operation mode and selectively activate the coarse SD setting circuit or the fine SD setting circuit according to the operation mode indicated by the control signal, and (iv) a low density parity check (LDPC) decoding circuit configured to perform iterative decoding based on the first piece of SD data or the second piece of SD data.

According to an additional embodiment of the invention, a memory system is provided, which includes a memory device and a memory controller. The memory device includes a cell array including a plurality of memory cells. The memory controller includes a processor and an ECC decoder. The processor includes a decoding-mode determination circuit configured to receive information on a lifespan or retention of a memory device and, based on the received information, determine one of a first operation mode and a second operation mode as an operation mode. The ECC decoder includes: (i) a coarse soft decision (SD) setting circuit storing a parameter value of a decoding operation that is based on a first piece of SD data obtained by a coarse SD read command, (ii) a fine SD setting circuit storing a parameter value of a decoding operation that is based on a second piece of SD data obtained by a fine SD read command, and (iii) a decoding circuit configured to perform iterative decoding based on the first piece of SD data or the second piece of SD data. The first operation mode may correspond to a mode for sequentially transmitting the coarse SD read command and the fine SD read command to the memory device, and the second operation mode may correspond to a mode for transmitting the fine SD read command to the memory device.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described with reference to the accompanying drawings.

Figure 1:
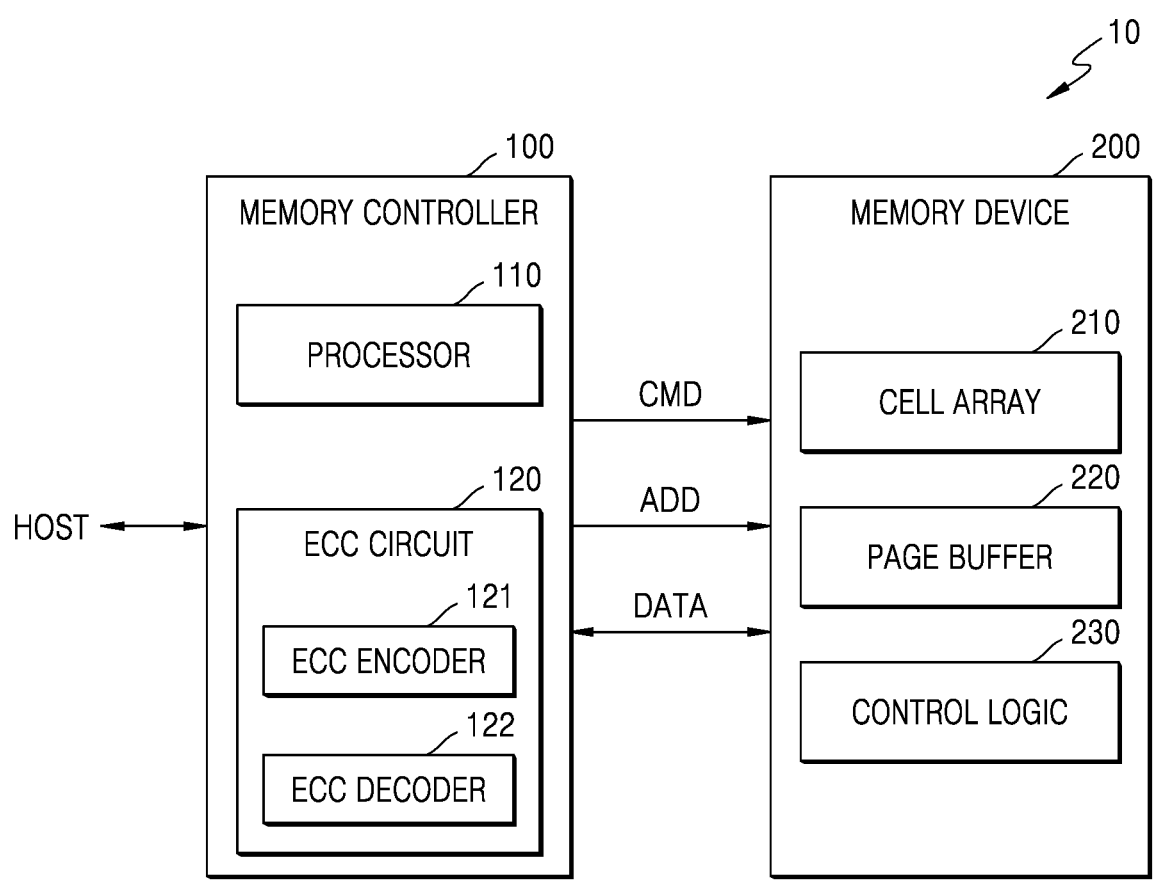
FIG. 1 is a block diagram illustrating a memory system according to an embodiment.

FIG. 1 is a block diagram illustrating a memory system 10 according to an embodiment. Referring to FIG. 1, the memory system 10 may include a memory controller 100 and a memory device 200, and the memory device 200 may include a memory cell array 210, a page buffer 220, and a control logic 230. In addition, the memory controller 100 may include a processor 110 and an error correction code (ECC) circuit 120, and the ECC circuit 120 may include an ECC encoder 121 and an ECC decoder 122.

According to an embodiment, the memory device 200 may include a non-volatile memory device. For example, the memory device 200 may include a non-volatile memory device such as a NAND flash memory device, a vertical NAND flash memory device, a NOR flash memory device, a resistive random access memory device, a phase-change memory device, or a magnetoresistive random access memory device.

In some embodiments, the memory device 200 or the memory system 10 may be implemented as a memory device or system embedded in an electronic device or as an external memory device or system attachable to an electronic device. For example, the memory device 200 or the memory system 10 may be implemented in various forms such as embedded Universal Flash Storage (UFS) memory, embedded Multi-Media Card (eMMC), Solid State Drive (SSD), UFS memory cards, Compact Flash (CF), Secure Digital (SD), Micro Secure Digital (Micro-SD), Mini Secure Digital (Mini-SD), extreme Digital (xD), or Memory Stick.

The memory controller 100 may control the memory device 200 in response to a write/read request from a host to read data stored in the memory device 200 or write data to (or program) the memory device 200. For example, the memory controller 100 may control program, read, and erase operations of the memory device 200 by providing addresses and commands to the memory device 200. In addition, data to be written to the memory device 200 and data read from the memory device 200 may be transmitted between the memory controller 100 and the memory device 200.

The memory cell array 210 may include a plurality of cell blocks. In addition, each of the plurality of cell blocks may include a plurality of pages, and each of the plurality of pages may include a plurality of memory cells. In the cell array 210, data erase operations may be performed in units of cell blocks, and data program operations and data read operations may be performed in units of at least portions of pages.

The processor 110 may control overall operations of the memory controller 100. For example, the processor 110 may control internal operations of the memory controller 100 or various operations of the memory controller 100 related to data erasing/programming/reading by executing instructions stored in the memory controller 100. In addition, the processor 110 may control the ECC circuit 120 to control ECC encoding operations and ECC decoding operations.

The ECC encoder 121 may generate a codeword by performing ECC encoding on a dataword programmed into the cell array 210. For example, the ECC encoder 121 may encode a dataword and input data obtained by adding a cyclic redundancy check (CRC) bit to the dataword. According to an embodiment, the ECC encoder 121 may be based on low density parity check (LDPC) encoding.

The ECC decoder 122 may perform ECC decoding on data read from the memory device 200. For example, the ECC decoder 122 may perform LDPC decoding on a codeword previously programmed into the memory device 200. The ECC decoder 122 may perform ECC decoding to detect an error location and correct an error bit according to the detected error location. When ECC decoding is successfully performed on a codeword, read data may be output from the memory controller 100 to the host.

The control logic 230 may control overall operations of the memory device 200 in relation to memory operations. For example, the control logic 230 may generate an internal control signal for an internal control operation of the memory device 200 that is based on a control signal (not shown) from the memory controller 100. According to an embodiment, the control logic 230 may perform an internal control operation to transmit data from the page buffer 220 to the cell array 210 in units of pages, and an internal control operation to transmit data from the page buffer 220 to the memory controller 100 in units of sub-pages.

In the embodiments described above, the ECC encoder 121 and the ECC decoder 122 are based on LDPC. However, embodiments are not limited thereto. In various embodiments, the ECC encoder 121 and the ECC decoder 122 may generate parity using Bose-Chaudhuri-Hocquenghem codes (BCH codes), Reed Solomon codes (RS codes), or other various types of error correction algorithms.

Furthermore, although the ECC circuit 120 is included in the memory controller 100 in the embodiment shown in FIG. 1, embodiments are not limited thereto. For example, the memory system 10 may be configured such that the ECC circuit 120 may be included in the memory device 200. Alternatively, some functions of the ECC circuit 120 may be employed in the memory device 200. For example, an ECC function for ECC encoding/decoding may be employed in the memory device 200.

Figure 2:
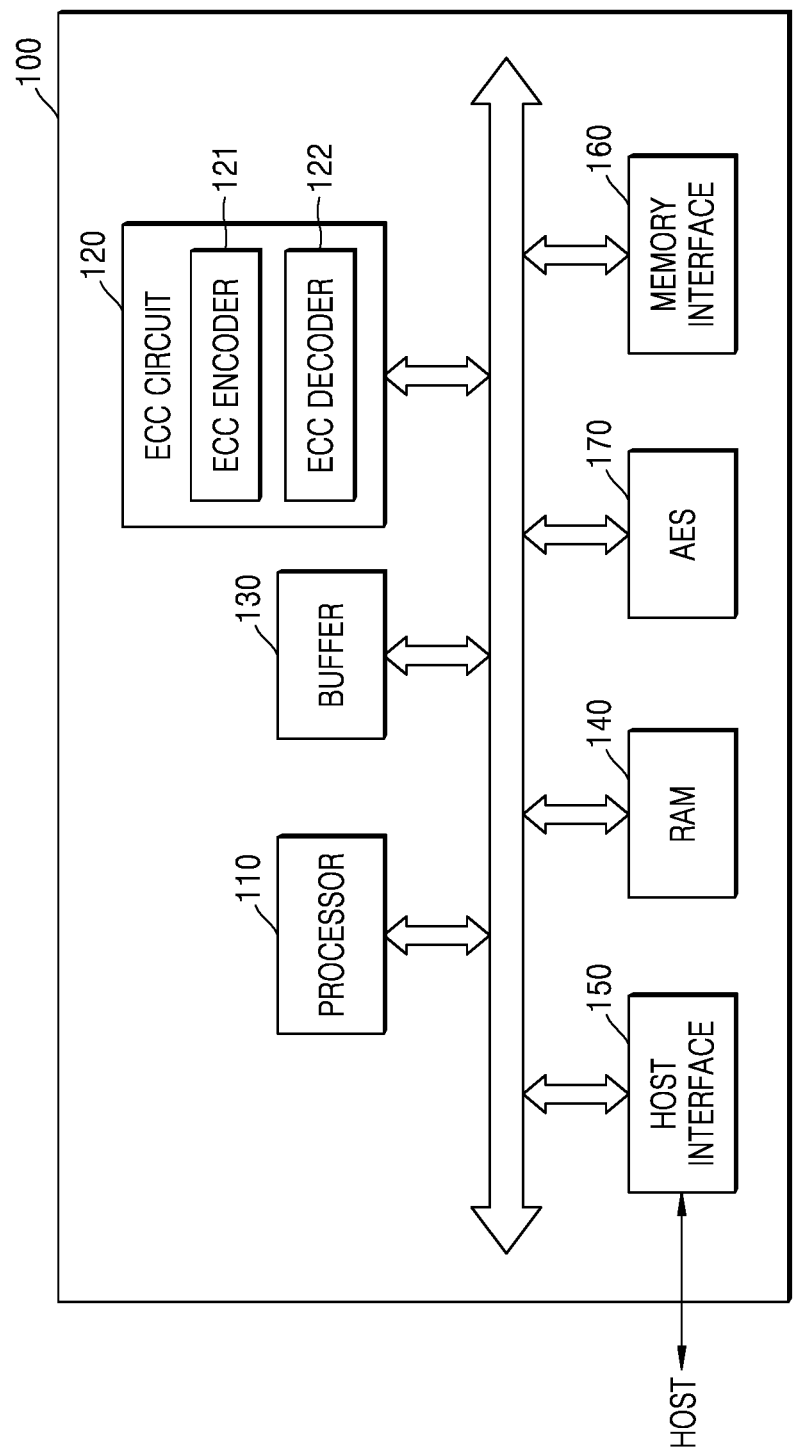
FIG. 2 is a block diagram illustrating an implementation example of a memory controller shown in FIG. 1.

FIG. 2 is a block diagram illustrating an implementation example of the memory controller 100 shown in FIG. 1. Referring to FIGS. 1 and 2, the memory controller 100 includes the processor 110, the ECC circuit 120, a buffer 130, a random access memory (RAM) 140, a host interface 150, a memory interface 160, and an advanced encryption standard (AES) 170. The processor 110 may be electrically connected to various elements of the memory controller 100 through buses and may perform control operations for the various elements.

The processor 110 may control the memory system 10 such that the memory system 10 may decode a request received from the host and perform an operation according to results of the decoding. In addition, the processor 110 may execute instructions stored in the RAM 140 or may control overall operations of the memory system 10 by using meta data stored in the RAM 140.

Data received from the host or data read from the memory device 200 may be temporarily stored in the buffer 130. According to an embodiment, when the host requests data writing, input data including a dataword and CRC bits may be stored in the buffer 130, and ECC encoding may be performed using data stored in the buffer 130. In addition, when the host requests data reading, a read codeword may be stored in the buffer 130, ECC decoding may be performed on the codeword stored in the buffer 130, and data obtained by the ECC decoding may be provided to the host as read data.

The host interface 150 may communicate with the host according to a predetermined interface scheme. Examples of the host interface 150 may include advanced technology attachment (ATA) interfaces, serial advanced technology attachment (SATA) interfaces, parallel advanced technology attachment (PATA) interfaces, universal serial bus (USB) or serial attached small computer system (SAS) interfaces, small computer system interfaces (SCSIs), eMMC interfaces, Unix file system (UFS) interfaces, and compute express link (CXL) interfaces. However, the host interface 150 is not limited to the examples listed above.

The memory interface 160 may be electrically connected to the memory device 200. For example, the memory interface 160 may support interfacing with a NAND flash memory chip or a NOR flash memory chip. The ECC circuit 120 may perform ECC encoding and ECC decoding according to the embodiments described above. In addition, the AES 170 may perform at least one of an encryption operation and a decryption operation on data input to the memory controller 100 by using various types of encryption/decryption algorithms (for example, a symmetric-key algorithm).

Figure 3:
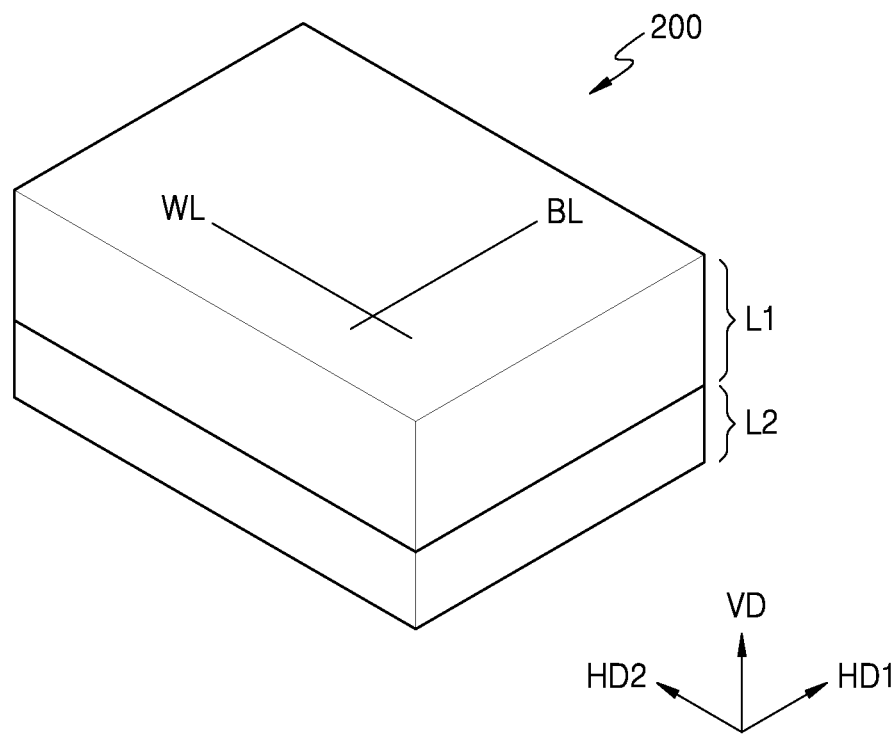
FIG. 3 is a diagram schematically illustrating a structure of a memory device shown in FIG. 1, according to an embodiment.

FIG. 3 is a diagram schematically illustrating a structure of the memory device 200 shown in FIG. 1, according to an embodiment. Although a cell over periphery (COP) structure is shown as an implementation example of the memory device 200, embodiments are not limited thereto. The memory device 200 may have various other structures. Referring to FIGS. 1 and 3, the memory device 200 may include a first semiconductor layer L1 and a second semiconductor layer L2, and the first semiconductor layer L1 may be disposed on the second semiconductor layer L2 in a vertical direction VD perpendicular to the second semiconductor layer L2. For example, the second semiconductor layer L2 may be disposed below the first semiconductor layer L1 in the vertical direction VD, and thus, the second semiconductor layer L2 may be disposed close to a substrate.

In an embodiment, the cell array 210 shown in FIG. 1 may be formed in the first semiconductor layer L1, and a peripheral circuit including the page buffer 220 and the control logic 230 shown in FIG. 1 may be formed in the second semiconductor layer L2. Therefore, the memory device 200 may have a structure in which the cell array 210 is disposed vertically relative to the peripheral circuit. That is, the memory device 200 may have a COP structure. The COP structure may effectively reduce the area of the memory device 200 in a horizontal direction and may improve the degree of integration of the memory device 200.

In an embodiment, the second semiconductor layer L2 may include a substrate, and the peripheral circuit may be formed in the second semiconductor layer L2 by forming, on the substrate, transistors and transistor-wring metal patterns. After the peripheral circuit is formed in the second semiconductor layer L2, the first semiconductor layer L1 including the cell array 210 may be formed on the second semiconductor layer L2, and metal patterns may be formed to electrically connect word lines WL and bit lines BL of the cell array 210 to the peripheral circuit formed in the second semiconductor layer L2. For example, the bit lines BL may extend in a first horizontal direction HD1, and the word lines WL may extend in a second horizontal direction HD2.

Figure 4:
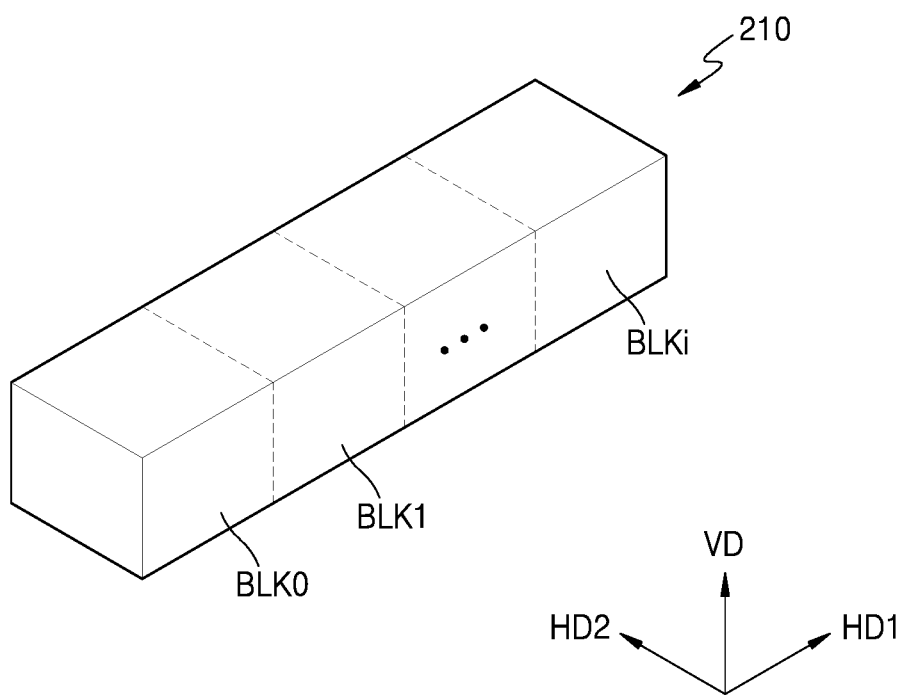
FIG. 4 is a diagram illustrating an example of a cell array shown in FIG. 1, according to an embodiment.

FIG. 4 is a diagram illustrating an example of the cell array 210 shown in FIG. 1, according to an embodiment. Referring to FIG. 4, the cell array 210 may include a plurality of cell blocks BLK0 to BLKi, where i may be a positive integer. Each of the plurality of cell blocks BLK0 to BLKi may have a 3D structure (or vertical structure). For example, each of the plurality of cell blocks BLK0 to BLKi may include a plurality of NAND strings extending in a vertical direction VD. In this case, the plurality of NAND strings may be apart from each other by a specific distance in first and second horizontal directions HD1 and HD2.

The plurality of cell blocks BLK0 to BLKi may be selected by a row decoder (not shown). For example, the row decoder may select a cell block corresponding to a block address from the plurality of cell blocks BLK0 to BLKi.

Figure 5:
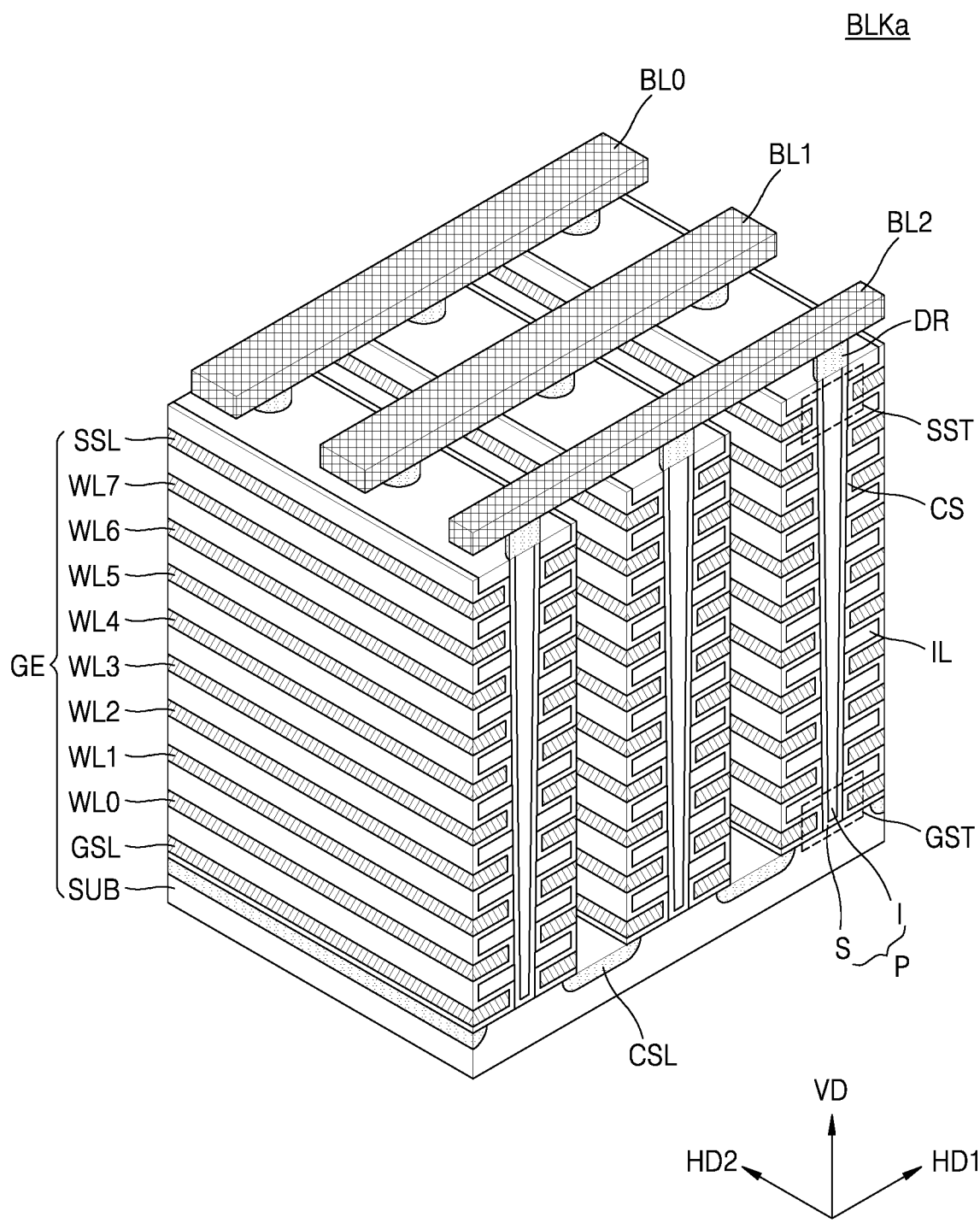
FIG. 5 is a perspective view illustrating a cell block shown in FIG. 4, according to an embodiment.

FIG. 5 is a perspective view illustrating a cell block BLKa shown in FIG. 4, according to an embodiment. Referring to FIG. 5, the cell block BLKa is formed in a direction perpendicular to a substrate SUB. The substrate SUB has a first conductivity type (for example, p-type). The substrate SUB includes common source lines CSL extending in a second horizontal direction HD2 and doped with a dopant of a second conductivity type (for example, n-type). A plurality of insulating films IL extending in the second horizontal direction HD2 are sequentially arranged in a vertical direction VD above the substrate SUB between two adjacent common source lines CSL, and the plurality of insulating films IL are apart from each other by a specific distance in the vertical direction VD. For example, the plurality of insulating films IL may include an insulating material such as silicon oxide.

A plurality of pillars P each provided between two adjacent common source lines CSL may be sequentially arranged on the substrate SUB in a first horizontal direction HD1. The plurality of pillars P may penetrate the plurality of insulating films IL in the vertical direction VD. For example, the plurality of pillars P may penetrate the plurality of insulating films IL and make contact with the substrate SUB. For example, a surface layer S of each of the plurality of pillars P may include a first-type silicon material and may function as a channel area. In addition, an inner layer I of each of the plurality of pillars P may include an insulating material such as silicon oxide or an air gap.

Charge storage layers CS are provided between every two adjacent common source lines CSL along exposed surfaces of the insulating films IL, the pillars P, and the substrate SUB. The charge storage layers CS may include a gate insulating layer (also referred to as a "tunneling insulating layer"), a charge trap layer, and a blocking insulating layer. For example, the charge storage layers CS may have an oxide-nitride-oxide (ONO) structure. In addition, gate electrodes GE such as selection lines GSL and SSL and word lines WL0 to WL7 may be provided on exposed surfaces of the charge storage layers CS each provided between two adjacent common source lines CSL.

Drains DR or drain contacts DR are respectively provided on the plurality of pillars P. For example, the drains DR or drain contacts DR may include a silicon material doped with a dopant of the second conductivity type. Bit lines BL0 to BL2 are provided on the drains DR. The bit lines BL0 to BL2 extend in the first horizontal direction HD1 and are apart from each other by a specific distance in the second horizontal direction HD2.

Figure 6:
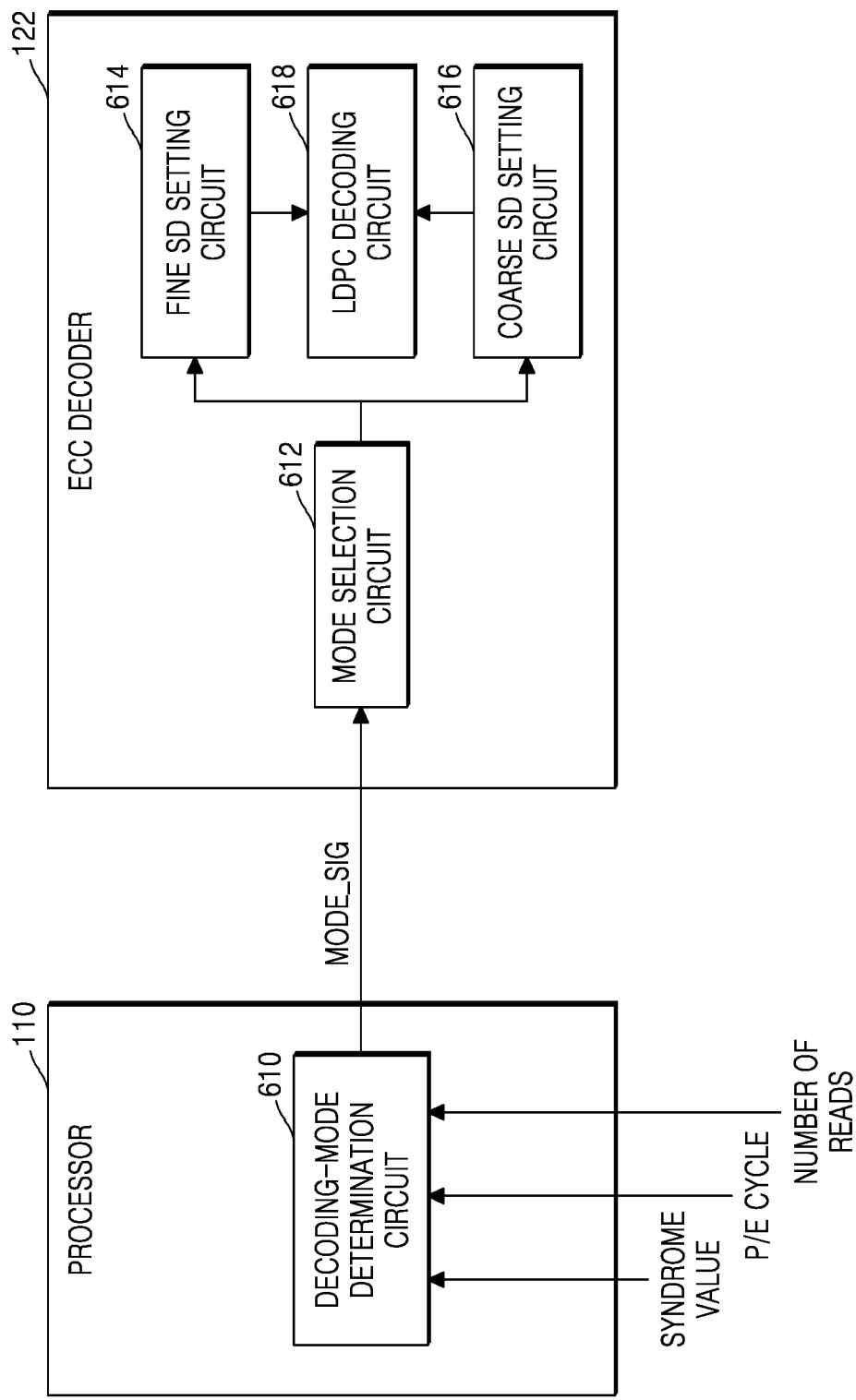
FIG. 6 is a view illustrating examples of a processor and an error correction code (ECC) decoder of the memory controller shown in FIG. 1, according to an embodiment.

FIG. 6 illustrates examples of the processor 110 and the ECC decoder 122 of the memory controller 100 shown in FIG. 1, according to an embodiment. Referring to FIG. 6, the processor 110 may further include a decoding-mode determination circuit 610. The decoding-mode determination circuit 610 may determine the operation mode of the ECC decoder 122. The decoding-mode determination circuit 610 may receive information (lifespan information) on the lifespan or retention of the memory device 200 and may generate a control signal MODE_SIG based on the received information to indicate the operation mode of the ECC decoder 122.

For example, the decoding-mode determination circuit 610 may receive program/erase (P/E) cycle information. The decoding-mode determination circuit 610 may receive P/E cycle information and monitor whether the number of P/E cycles of the memory device 200 exceeds a threshold count. When the decoding-mode determination circuit 610 receives P/E cycle information less than the threshold count, the decoding-mode determination circuit 610 may generate a control signal MODE_SIG indicating a first operation mode and may provide the control signal MODE_SIG to the ECC decoder 122. The first operation mode may be a mode in which the ECC decoder 122 preemptively performs coarse soft decision (SD) reading and coarse SD decoding. That is, in the first operation mode, when the ECC decoder 122 fails in coarse SD decoding, the ECC decoder 122 may additionally perform fine SD reading and fine SD decoding in response to the failure. When the decoding-mode determination circuit 610 receives P/E cycle information exceeding the threshold count, the decoding-mode determination circuit 610 may generate a control signal MODE_SIG indicating a second operation mode and may provide the control signal MODE_SIG to the ECC decoder 122. The second operation mode may be a mode in which the ECC decoder 122 performs fine SD reading and fine SD decoding.

In another example, the decoding-mode determination circuit 610 may receive information about the number of reads. The decoding-mode determination circuit 610 may receive information on the number of reads and may compare the received information with a threshold count of the memory device 200. When the decoding-mode determination circuit 610 receives information on the number of readings that is less than the threshold count, the decoding-mode determination circuit 610 may generate a control signal MODE_SIG indicating the first operation mode and may provide the control signal MODE_SIG to the ECC decoder 122. When the decoding-mode determination circuit 610 receives information about the number of readings that exceeds the threshold count, the decoding-mode determination circuit 610 may generate a control signal MODE_SIG indicating the second operation mode and may provide the control signal MODE_SIG to the ECC decoder 122.

In another example, the decoding-mode determination circuit 610 may receive a syndrome value. The syndrome value may be a value indicating the number of non-zero bits included in results of an operation on previous hard decision (HD) decoding results and a parity check matrix. When the decoding-mode determination circuit 610 receives a syndrome value less than a threshold value, the decoding-mode determination circuit 610 may generate a control signal MODE_SIG indicating the first operation mode and may provide the control signal MODE_SIG to the ECC decoder 122. When the decoding-mode determination circuit 610 receives a syndrome value exceeding the threshold value, the decoding-mode determination circuit 610 may generate a control signal MODE_SIG indicating the second operation mode and may provide the control signal MODE_SIG to the ECC decoder 122.

In the embodiments described above, the decoding-mode determination circuit 610 is illustrated as receiving information about a syndrome value, a P/E cycle, and the number of reads. However, this is merely an example. In various embodiments, the decoding-mode determination circuit 610 may receive various pieces of information about the lifespan or retention of the memory device 200 and may determine the operation mode of the ECC decoder 122 based on the various pieces of information.

In an embodiment, the ECC decoder 122 may further include a mode selection circuit 612, a fine SD setting circuit 614, a coarse SD setting circuit 616 and an LDPC decoding circuit 618. The mode selection circuit 612 may receive a control signal MODE_SIG indicating the operation mode of the ECC decoder 122. The mode selection circuit 612 may activate the coarse SD setting circuit 616 in response to the reception of a control signal MODE_SIG indicating the first operation mode. The mode selection circuit 612 may deactivate the coarse SD setting circuit 616 in response to the reception of a control signal MODE_SIG indicating the second operation mode. That is, the fine SD setting circuit 614 may always be in an activated state, and the coarse SD setting circuit 616 may be activated or deactivated according to the first operation mode or the second operation mode. For example, the coarse SD setting circuit 616 may be activated in response to the reception of a control signal MODE_SIG indicating the first operation mode, and may be deactivated in response to the reception of a control signal MODE_SIG indicating the second operation mode.

The coarse SD setting circuit 616 may store setting values of the LDPC decoding circuit 618. The coarse SD setting circuit 616 may transfer first parameter values for coarse SD decoding to the LDPC decoding circuit 618 in response to the first operation mode. The coarse SD decoding may refer to LDPC decoding based on HD and SD values obtained through a coarse SD read operation. The coarse SD read operation may refer to an operation of acquiring all HD and SD values by transmitting only once one of read commands from the memory controller 100 to the memory device 200.

In the first operation mode, the ECC decoder 122 may activate both the coarse SD setting circuit 616 and the fine SD setting circuit 614. However, the coarse SD setting circuit 616 may be activated before the fine SD setting circuit 614 is activated, and the fine SD setting circuit 614 may be activated after coarse SD decoding. For example, the ECC decoder 122 may perform HD reading and decoding according to a read request.

When decoding for an HD read fails, the ECC decoder 122 may perform coarse SD decoding. That is, the coarse SD setting circuit 616 may be activated in response to a failure of decoding for an HD read. The coarse SD setting circuit 616 may provide the LDPC decoding circuit 618 with first parameter values for performing LDPC decoding based on HD and SD values obtained through the coarse SD read operation. SD values obtained through the coarse SD read operation may be less accurate than SD values obtained by repeating an HD read a plurality of times. Therefore, to decrease an LDPC decoding period of time, the coarse SD setting circuit 616 may provide the LDPC decoding circuit 618 with a first parameter value for setting the maximum repetition number of LDPC decoding to be small.

When coarse SD decoding fails, the ECC decoder 122 may perform fine SD decoding. That is, the fine SD setting circuit 614 may be activated in response to a failure of coarse SD decoding. The fine SD setting circuit 614 may provide second parameter values for performing LDPC decoding to the LDPC decoding circuit 618 based on SD values obtained through a fine SD read operation. The fine SD read operation is related to one of read commands that the memory controller 100 transmits to the memory device 200 and is different from the coarse SD read operation. The fine SD read operation may be an operation of acquiring SD values by performing a plurality of reads. The SD values obtained through the fine SD read operation may be more accurate than SD values obtained through the coarse SD read operation. In addition, the ECC decoder 122 may set the maximum repetition number of LDPC decoding to be larger to increase the probability of success of fine SD decoding. The fine SD setting circuit 614 may provide the LDPC decoding circuit 618 with a second parameter value for setting the maximum repetition number of LDPC decoding to be larger. For example, the maximum repetition number of LDPC decoding using the first parameter value may be less than or equal to the maximum repetition number of LDPC decoding using the second parameter value.

In the embodiments described above, each of the first parameter value and the second parameter value includes information on the maximum repetition number of LDPC decoding, but is not limited thereto. In various embodiments, the first parameter value and the second parameter value may further include information about a first log-likelihood ratio (LLR) set for coarse SD decoding and a second LLR set for fine SD decoding. In this case, the first LLR set may be different from the second LLR set.

Figure 7:
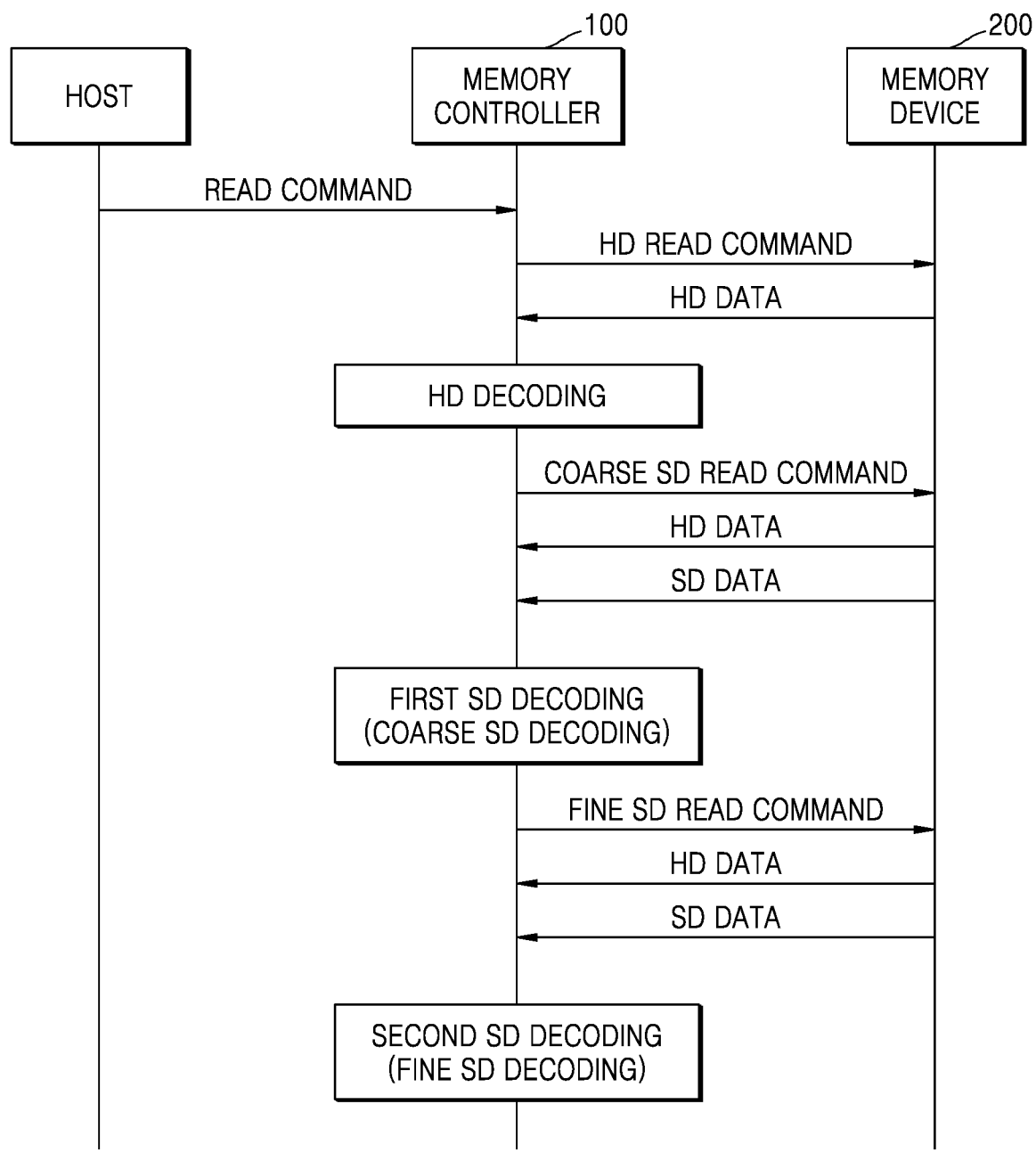
FIG. 7 is a view illustrating an example of signal exchange between the memory controller and the memory device according to an embodiment.

FIG. 7 illustrates an example of signal exchange between the memory controller 100 and the memory device 200 according to an embodiment. Referring to FIG. 7, the memory controller 100 may receive a read command from the host. The memory controller 100 may provide an HD read command to the memory device 200 in response to the read command. The memory device 200 may provide HD data to the memory controller 100 by performing a read operation once in response to the HD read command.

The memory controller 100 may perform an HD decoding operation on the HD data. For example, the ECC decoder 122 of the memory controller 100 may perform an operation using the HD data and a parity check matrix. When results of the operation using the HD data and the parity check matrix is a zero matrix, the ECC decoder 122 may determine that the HD decoding operation is successful. Although not shown in FIG. 7, when the HD decoding operation is successful, the memory controller 100 may provide the HD data as read data to the host. However, when the results of the operation using the HD data and the parity check matrix is not a zero matrix, the ECC decoder 122 may determine that the HD decoding operation was unsuccessful. Additionally, the ECC decoder 122 may provide the decoding-mode determination circuit 610 of the processor 110 with a syndrome value indicating the number of non-zero elements included in results of the operation.

The memory controller 100 may transmit a coarse SD read command to the memory device 200 in response to a failure of the HD decoding operation. The coarse SD read command may be a command indicating a read operation of acquiring both HD data and SD data within a time period of one read. The memory device 200 may output HD data and SD data to the memory controller 100 in response to the coarse SD read command. Therefore, an access, such as a direct memory access (DMA), may be made twice in response to the coarse SD read command. The SD data obtained by the coarse SD read command may be slightly less accurate than SD data obtained by a read command for a time period of a plurality of reads.

The memory controller 100 may perform a first SD decoding operation. The first SD decoding operation may be based on the SD data obtained by the coarse SD read command, and may be referred to as a coarse SD decoding operation or a fast SD decoding operation. The maximum repetition number of decoding in the first SD decoding operation may be set to be low. For example, the ECC decoder 122 may receive a control signal MODE_SIG indicating the first operation mode from the memory controller 100 in response to a failure of the HD decoding operation. The ECC decoder 122 may activate the coarse SD setting circuit 616 based on the control signal MODE_SIG and may provide a first parameter value to the LDPC decoding circuit 618. The LDPC decoding circuit 618 may lower the maximum repetition number of LDPC decoding according to the first parameter value. That is, the coarse SD setting circuit 616 may store, in advance, the first parameter value that is for changing the maximum repetition number of LDPC decoding to a relatively small value. In an embodiment, the maximum repetition number of LDPC decoding to be performed according to the first parameter value may be less than or equal to the maximum repetition number of LDPC decoding to be performed according to a second parameter value. The LDPC decoding circuit 618 may perform iterative decoding by decreasing the maximum repetition number of LDPC decoding according to a parameter that is previously stored in the coarse SD setting circuit 616 in relation to the maximum repetition number of LDPC decoding.

In the embodiments described above, the LDPC decoding circuit 618 lowers the maximum repetition number of LDPC decoding based on the first parameter value. However, embodiments are not limited thereto. In various embodiments, the LDPC decoding circuit 618 may maintain the maximum repetition number of LDPC decoding at a preset basic value regardless of the first parameter value transmitted to the LDPC decoding circuit 618.

The ECC decoder 122 of the memory controller 100 may perform an operation using data decoded as many times as the maximum repetition number and a parity check matrix to determine whether the coarse SD decoding operation is successful. For example, when the result of the operation using the decoded data and the parity check matrix a zero matrix, the ECC decoder 122 may determine that the coarse SD decoding operation is successful. In another example, when the result of the operation using the decoded data and the parity check matrix is not a zero matrix, the ECC decoder 122 may determine that the coarse SD decoding operation was unsuccessful.

The memory controller 100 may perform a second SD decoding operation. The second SD decoding operation may be based on SD data obtained by a fine SD read command, and may be referred to as a fine SD decoding operation or a normal SD decoding operation. The maximum repetition number of decoding in the second SD decoding operation may be set to be larger. For example, the ECC decoder 122 may receive a control signal MODE_SIG indicating the second operation mode from the memory controller 100 in response to a failure of the coarse SD decoding operation. The ECC decoder 122 may activate the fine SD setting circuit 614 based on the control signal MODE_SIG indicating the second operation mode and may transmit the second parameter value to the LDPC decoding circuit 618. The LDPC decoding circuit 618 may increase the maximum repetition number of LDPC decoding according to the received second parameter value. That is, the fine SD setting circuit 614 may store in advance the second parameter value that is for changing the maximum repetition number of LDPC decoding to a relatively large value. According to an embodiment, the maximum repetition number of LDPC decoding using the second parameter value may be equal to or greater than the maximum repetition number of LDPC decoding using the first parameter value. The LDPC decoding circuit 618 may perform iterative decoding by increasing the maximum repetition number of LDPC decoding according to a parameter that is previously stored in the fine SD setting circuit 614 in relation to the maximum repetition number of LDPC decoding.

In the embodiments described hereinabove, the LDPC decoding circuit 618 increases the maximum repetition number of LDPC decoding based on the second parameter value. However, embodiments are not limited thereto. Moreover, in various other embodiments, the LDPC decoding circuit 618 may maintain the maximum repetition number of LDPC decoding at a preset default value regardless of the second parameter value transmitted to the LDPC decoding circuit 618.

The ECC decoder 122 of the memory controller 100 may perform an operation using data decoded as many times as the maximum repetition number and a parity check matrix to determine whether the fine SD decoding operation is successful. For example, when the result of the operation using the decoded data and the parity check matrix results in a zero matrix, the ECC decoder 122 may determine that the fine SD decoding operation is successful. In another example, when the result of the operation using the decoded data and the parity check matrix is not a zero matrix, the ECC decoder 122 may determine that the fine SD decoding operation was unsuccessful. When the fine SD decoding operation is unsuccessful, the ECC decoder 122 may determine that the prior reading by the read command was unsuccessful, and the memory controller 100 may provide a response signal indicating a read failure to the host.

Figure 8:
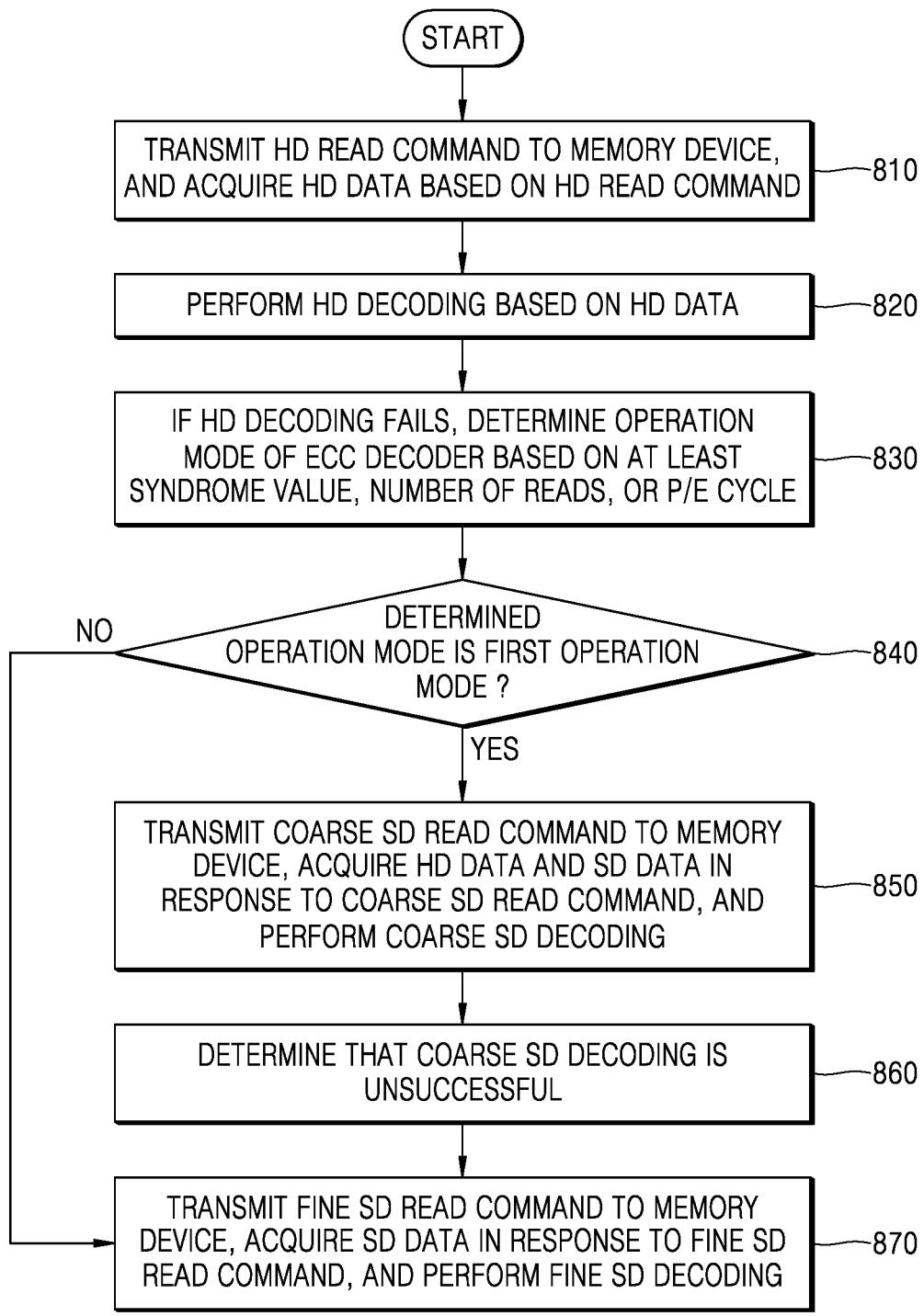
FIG. 8 is a flowchart illustrating a method of operating the memory controller according to an embodiment.

FIG. 8 is a flowchart illustrating a method of operating the memory controller 100 according to an embodiment. Referring to FIG. 8, in operation 810, the memory controller 100 may transmit an HD read command to the memory device 200 and may obtain HD data based on the HD read command. The HD read command is transmitted for an operation of reading data from the memory device 200 at a reference read voltage. The memory device 200 may output the HD data in response to the HD read command.

In operation 820, the memory controller 100 may perform an HD decoding operation based on the HD data. For example, the ECC decoder 122 of the memory controller 100 may receive the HD data and determine whether the result of an operation on the HD data and a parity check matrix is a zero matrix. When the result of the operation is not a zero matrix, the ECC decoder 122 may determine that the HD decoding operation was unsuccessful.

In operation 830, when the HD decoding operation is unsuccessful, the memory controller 100 may determine the operation mode of the ECC decoder 122 based on, at least, a syndrome value, the number of reads, or a P/E cycle. The decoding-mode determination circuit 610 of the processor 110 may determine the operation mode of the ECC decoder 122 based on various pieces of information. For example, the decoding-mode determination circuit 610 may determine the operation mode of the ECC decoder 122 based on information on the lifespan of the memory device 200 (for example, a P/E cycle), information on the retention of the memory device 200 (for example, information on the number of reads), or information on HD decoding failure (for example, a syndrome value).

In an embodiment, when it is determined that the number of P/E cycles exceeds a threshold count, the decoding-mode determination circuit 610 may select a second operation mode. That is, when the number of P/E cycles exceeds the threshold count, the decoding-mode determination circuit 610 may focus on lifespan extension and may generate a control signal MODE_SIG such that immediately after the failure of the HD decoding operation, the ECC decoder 122 may perform a fine SD decoding operation using SD data obtained based on results of a plurality of reads without performing a coarse SD decoding operation (or while bypassing a coarse SD decoding operation).

In addition, when the number of P/E cycles is less than the threshold count, the decoding-mode determination circuit 610 may select a first operation mode. That is, when the number of P/E cycles is less than the threshold count (i.e., when the expiration date of the memory device 200 is far enough in the future), the decoding-mode determination circuit 610 may focus on performance improvements and may generate a control signal MODE_SIG such that after the failure of the HD decoding operation, the ECC decoder 122 may perform a coarse SD decoding operation in the first operation mode, and then even when the coarse SD decoding operation fails, the ECC decoder 122 may perform a fine SD decoding operation in the second operation mode.

In operation 840, the memory controller 100 may determine whether the determined operation mode of the ECC decoder 122 is the first operation mode. For example, when the number of P/E cycles is less than the threshold count, the decoding-mode determination circuit 610 may provide the ECC decoder 122 with a control signal MODE_SIG indicating the first operation mode. In another example, when the number of P/E cycles exceeds the threshold count, the decoding-mode determination circuit 610 may select the second operation mode as the operation mode of the ECC decoder 122. When the determined operation mode of the ECC decoder 122 is the second operation mode, operation 870 may be performed.

In operation 850, the ECC decoder 122 may transmit a coarse SD read command to the memory device 200, receive HD data and SD data in response to the coarse SD read command, and perform a coarse SD decoding operation. The ECC decoder 122 may perform iterative decoding by using the SD data obtained according to the coarse SD read command.

In operation 860, the ECC decoder 122 may determine that coarse SD decoding operation was unsuccessful. For example, the ECC decoder 122 may obtain result data by iteratively decoding the SD data acquired in response to the coarse SD read command. The ECC decoder 122 may perform an operation on the result data with a parity check matrix, and when the result of the operation is not a zero matrix, the ECC decoder 122 may determine that the coarse SD decoding operation was unsuccessful. The ECC decoder 122 operating in the first operation mode may go to operation 870 to perform a fine SD decoding operation.

In operation 870, the memory controller 100 may transmit a fine SD read command to the memory device 200, receive SD data in response to the fine SD read command, and may perform a fine SD decoding operation. For example, the memory device 200 may obtain the SD data by performing a plurality of reads in response to the reception of the fine SD read command. The ECC decoder 122 may perform iterative decoding by using the SD data obtained according to the fine SD read command. In this case, the number of times of iterative decoding in operation 870 may be greater than the number of times of iterative decoding in operation 850. The reason for this is that a second parameter value stored in the fine SD setting circuit 614 in relation to the maximum repetition number of decoding is greater than or equal to a first parameter value stored in the coarse SD setting circuit 616 in relation to the maximum repetition number of decoding. In various embodiments, when the fine SD decoding operation is unsuccessful, the memory controller 100 may transmit a response signal indicating a read failure to the host.

Figure 9:
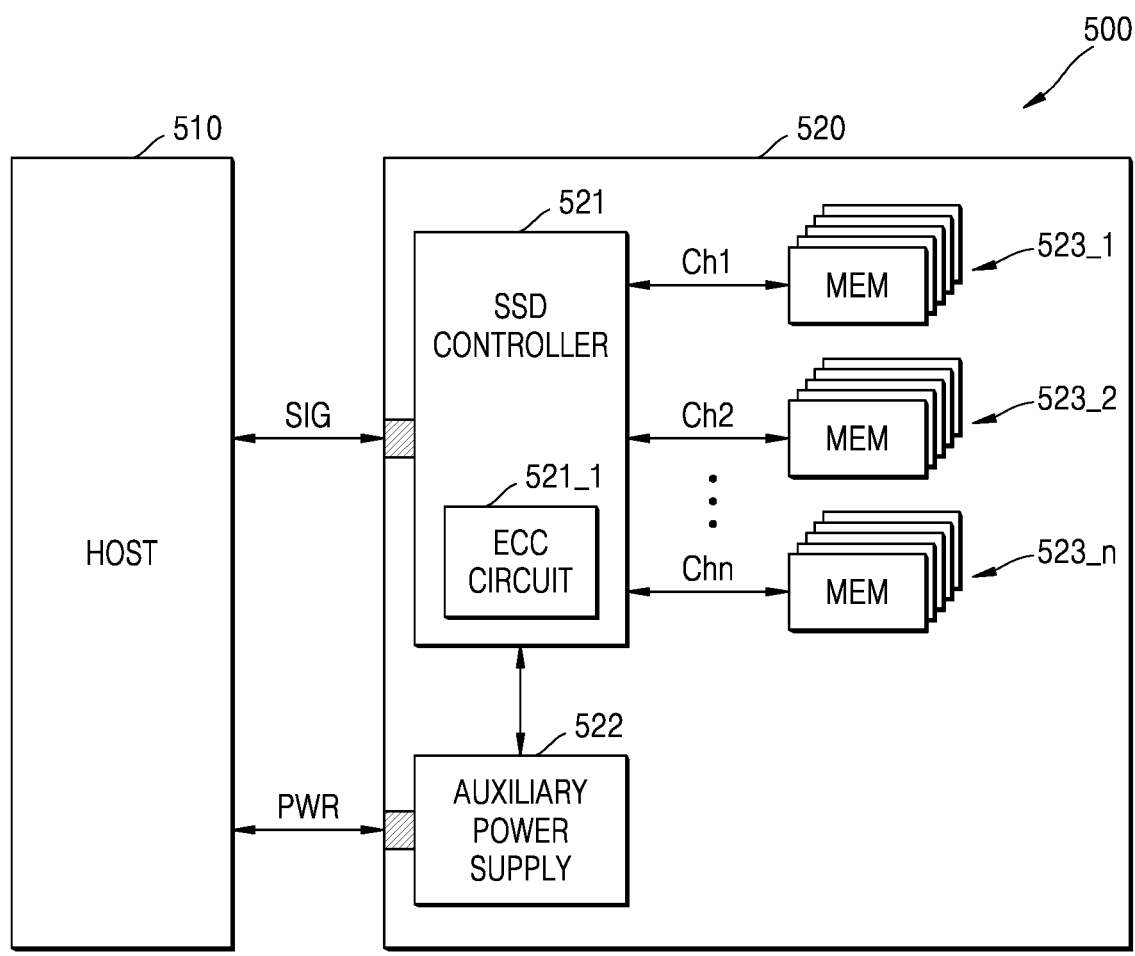
FIG. 9 is a block diagram illustrating an example in which memory devices are applied to a solid state drive (SSD) system according to an embodiment.

FIG. 9 is a block diagram illustrating an example in which memory devices 523_1 to 523_n are applied to an SSD system 500 according to embodiments. Referring to FIG. 9, the SSD system 500 may include a host 510 and an SSD 520. The SSD 520 may exchange signals with the host 510 through a signal connector and may receive power from the host 510 through a power connector. The SSD 520 may include an SSD controller 521, an auxiliary power supply 522, and the memory devices 523_1 to 523_n. The memory devices 523_1 to 523_n may be vertically stacked NAND flash memory devices. In this case, the SSD 520 may be implemented according to the embodiments described above with reference to FIGS. 1 to 8. That is, the SSD controller 521 of the SSD 520 may include an ECC circuit 521_1 provided as described above in the previous embodiments, and may perform SD decoding based on SD data acquired according to a coarse SD read command.

Figure 10:
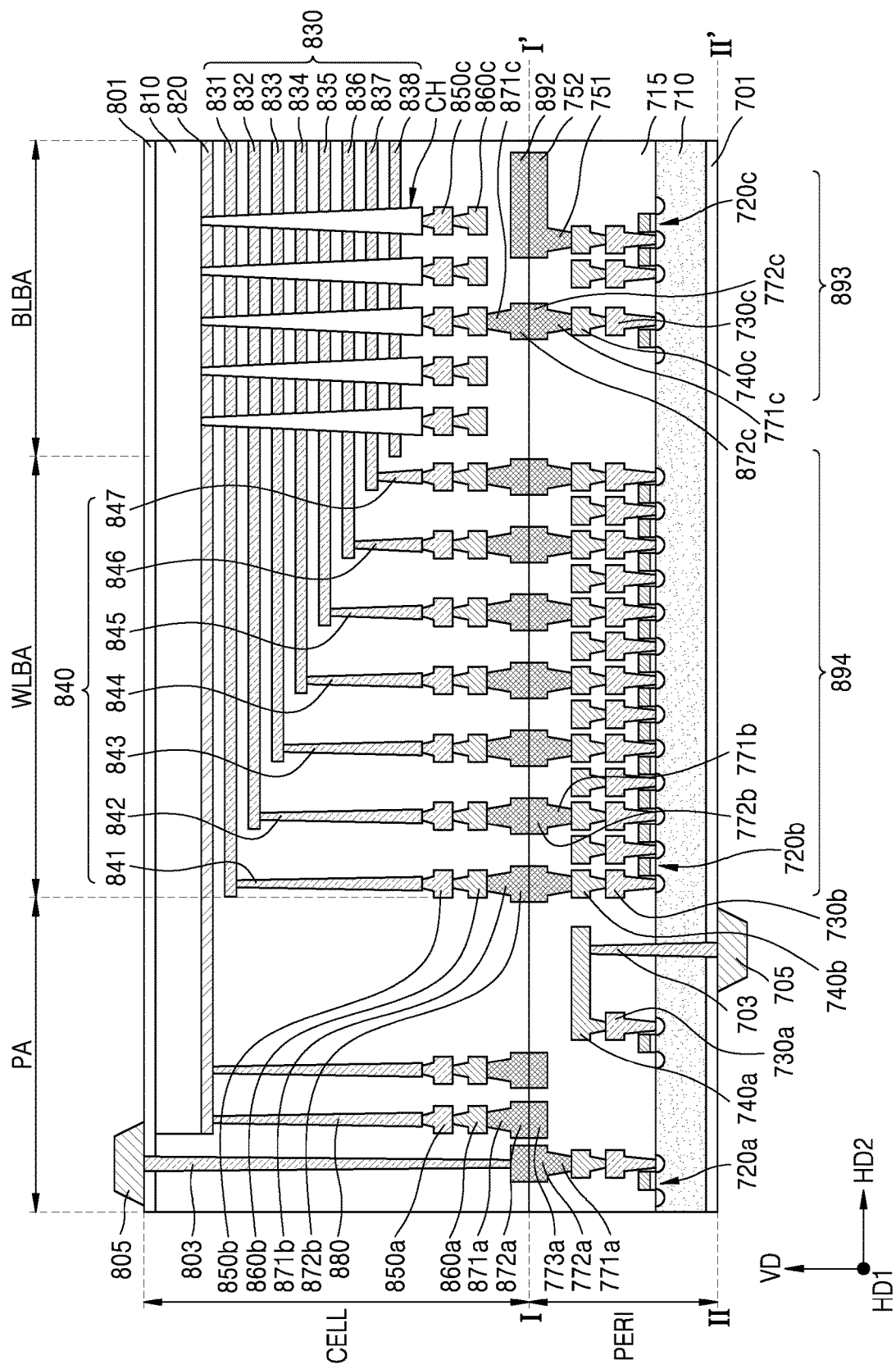
FIG. 10 is a cross-sectional view illustrating a memory device according to an embodiment.

FIG. 10 is a cross-sectional view illustrating a memory device 600 according to an embodiment. Referring to FIG. 10, the memory device 600 may have a chip-to-chip (C2C) structure. The C2C structure may be provided by fabricating an upper chip including a cell area CELL on a first wafer, fabricating a lower chip including a peripheral circuit area PERI on a second wafer that is different from the first wafer, and connecting the upper chip and the lower chip to each other by a bonding method. For example, the bonding method may refer to a method of electrically connecting a bonding metal formed on an uppermost metal layer of the upper chip and a bonding metal formed on an uppermost metal layer of the lower chip to each other. For example, when the bonding metals include copper (Cu), the bonding method may be a Cu—Cu bonding method. In another example, the bonding metals may include aluminum or tungsten. The embodiments described with reference to FIGS. 1 to 9 may be implemented in the memory device 600, and the memory controller 100 described above with reference to FIGS. 1 to 9 may be provided in the peripheral circuit area PERI.

The peripheral circuit area PERI and the cell area CELL of the memory device 600 may include an outer pad bonding area PA, a word line bonding area WLBA, and a bit line bonding area BLBA. The peripheral circuit area PERI may include: a first substrate 710; an interlayer insulating layer 715; a plurality of circuit elements 720a, 720b, and 720c formed on the first substrate 710; first metal layers 730a, 730b, and 730c respectively connected to the plurality of circuit elements 720a, 720b, and 720c; and second metal layers 740a, 740b, and 740c formed on the first metal layers 730a, 730b, and 730c. In an embodiment, the first metal layers 730a, 730b, and 730c may include tungsten having relatively high resistance, and the second metal layers 740a, 740b, and 740c may include copper having relatively low resistance.

Although only the first metal layers 730a, 730b, and 730c and the second metal layers 740a, 740b, and 740c are shown and described in the current embodiment, embodiments are not limited thereto. For example, one or more metal layers may be further formed on the second metal layers 740a, 740b, and 740c. At least some of the one or more metal layers formed on the second metal layers 740a, 740b, and 740c may include aluminum having lower resistance than copper included in the second metal layers 740a, 740b, and 740c.

The interlayer insulating layer 715 may be provided on the first substrate 710 to cover the plurality of circuit elements 720a, 720b, and 720c, the first metal layers 730a, 730b, and 730c, and the second metal layers 740a, 740b, and 740c. The interlayer insulating layer 715 may include an insulating material such as silicon oxide, silicon nitride, or the like.

Lower bonding metals 771b and 772b may be formed on the second metal layer 740b in the word line bonding area WLBA. In the word line bonding area WLBA, the lower bonding metals 771b and 772b of the peripheral circuit area PERI may be electrically connected to upper bonding metals 871b and 872b of the cell area CELL by a bonding method, and the lower bonding metals 771b and 772b and the upper bonding metals 871b and 872b may include aluminum, copper, or tungsten. The upper bonding metals 871b and 872b of the cell area CELL may be referred to as first metal pads, and the lower bonding metals 771b and 772b of the peripheral circuit area PERI may be referred to as second metal pads.

The cell area CELL may provide at least one memory block. The cell area CELL may include a second substrate 810 and a common source line 820. A plurality of word lines 831 to 838 (830) may be stacked on the second substrate 810 in a direction VD perpendicular to an upper surface of the second substrate 810. String selection lines and a ground selection line may be arranged above and below the plurality of word lines 830. That is, the plurality of word lines 830 may be disposed between the string selection lines and the ground selection line.

In the bit line bonding area BLBA, channel structures CH may extend through the word lines 830, the string selection lines, and the ground selection line in a direction perpendicular to the upper surface of the second substrate 810. The channel structures CH may include a data storage layer, a channel layer, and a buried insulating layer, and the channel layer may be electrically connected to a first metal layer 850c and a second metal layer 860c. For example, the first metal layer 850c may form bit line contacts, and the second metal layer 860c may form bit lines. In an embodiment, the bit lines may extend in a first horizontal direction HD1 parallel to the upper surface of the second substrate 810.

In the embodiment shown in FIG. 10, an area in which the channel structures CH and the bit lines are arranged may be defined as the bit line bonding area BLBA. In the bit line bonding area BLBA, the bit lines may be electrically connected to the circuit elements 720c that provide a page buffer 893 in the peripheral circuit area PERI. For example, the bit lines may be connected to upper bonding metals 871c and 872c of the cell area CELL, and the upper bonding metals 871c and 872c may be connected to lower bonding metals 771c and 772c that are connected to the circuit elements 720c of the page buffer 893.

In the word line bonding area WLBA, the word lines 830 may extend in a second horizontal direction HD2 parallel to the upper surface of the second substrate 810, and may be connected to a plurality of cell contact plugs 841-847 (840).

The word lines 830 and the cell contact plugs 840 may be connected to each other through pads formed by extending at least some of the word lines 830 to different lengths in the second horizontal direction HD2. A first metal layer 850b and a second metal layer 860b may be sequentially connected to upper portions of the cell contact plugs 840 connected to the word lines 830. In the word line bonding area WLBA, the cell contact plugs 840 may be connected to the peripheral circuit area PERI through the upper bonding metals 871b and 872b of the cell area CELL and the lower bonding metals 771b and 772b of the peripheral circuit area PER.

The cell contact plugs 840 may be electrically connected to the circuit elements 720b that provide a row decoder 894 in the peripheral circuit area PERI. In an embodiment, operating voltages of the circuit elements 720b providing the row decoder 894 may be different from operating voltages of the circuit elements 720c providing the page buffer 893. For example, the operating voltages of the circuit elements 720c providing the page buffer 893 may be higher than the operating voltages of the circuit elements 720b providing the row decoder 894.

A common source line contact plug 880 may be disposed in the outer pad bonding area PA. The common source line contact plug 880 may include a conductive material such as a metal, a metal compound, or polysilicon, and may be electrically connected to the common source line 820. A first metal layer 850a and a second metal layer 860a may be sequentially stacked on the common source line contact plug 880. For example, an area in which the common source line contact plug 880, the first metal layer 850a, and the second metal layer 860a are disposed may be defined as the outer pad bonding area PA.

In addition, first and second input/output pads 705 and 805 may be disposed in the outer pad bonding area PA. Referring to FIG. 10, a lower insulating film 701 may be formed below the first substrate 710 to cover a lower surface of the first substrate 710. The first input/output pad 705 may be formed on the lower insulating layer 701. The first input/output pad 705 may be connected through a first input/output contact plug 703 to at least one of the plurality of circuit elements 720a, 720b, and 720c arranged in the peripheral circuit area PERI, and may be separate from the first substrate 710 by the lower insulating layer 701. In addition, a side insulating layer may be provided between the first input/output contact plug 703 and the first substrate 710 to electrically separate the first input/output contact plug 703 from the first substrate 710.

Referring to FIG. 10, an upper insulating layer 801 covering the upper surface of the second substrate 810 may be formed on the second substrate 810, and the second input/output pad 805 may be formed on the upper insulating layer 801. The second input/output pad 805 may be connected through a second input/output contact plug 803 to at least one of the plurality of circuit elements 720a, 720b, and 720c arranged in the peripheral circuit area PERI.

In some embodiments, the second substrate 810, the common source line 820, and the like may not be disposed in an area in which the second input/output contact plug 803 is disposed. In addition, the second input/output pad 805 may overlap the word lines 830 in a vertical direction (VD). Referring to FIG. 10, the second input/output contact plug 803 may be separate from the second substrate 810 in a direction parallel to the upper surface of the second substrate 810, and may be connected to the second input/output pad 805 through an interlayer insulating layer of the cell area CELL.

In some embodiments, the first input/output pad 705 and the second input/output pad 805 may be selectively formed. For example, the memory device 600 may include only the first input/output pad 705 disposed on the first substrate 710, or may include only the second input/output pad 805 disposed on the second substrate 810. Alternatively, the memory device 600 may include both the first input/output pad 705 and the second input/output pad 805.

In the outer pad bonding area PA and the bit line bonding area BLBA of the cell area CELL and the peripheral circuit area PERI, metal patterns of the uppermost metal layers may be dummy patterns, or the uppermost metal layers may be empty.

In the outer pad bonding area PA of the memory device 600, a lower metal pattern 773a corresponding to and having the same shape as an upper metal pattern 872a formed in the uppermost metal layer of the cell area CELL may be formed in the uppermost metal layer of the peripheral circuit area PERI. The lower metal pattern 773a formed in the uppermost metal layer of the peripheral circuit area PERI may not be connected to a separate contact in the peripheral circuit area PERI. Similarly, in the outer pad bonding area PA, the upper metal pattern 872a corresponding to and having the same shape as the lower metal pattern 773a formed in the uppermost metal layer of the peripheral circuit area PERI may be formed in the uppermost metal layer of the cell area CELL.

The lower bonding metals 771b and 772b may be formed on the second metal layer 740b in the word line bonding area WLBA. In the word line bonding area WLBA, the lower bonding metals 771b and 772b of the peripheral circuit area PERI may be electrically connected to the upper bonding metals 871b and 872b of the cell area CELL by a bonding method.

Furthermore, in the bit line bonding area BLBA, an upper metal pattern 892 corresponding to and having the same shape as a lower metal pattern 752 formed in the uppermost metal layer of the peripheral circuit area PERI may be formed in the uppermost metal layer of the cell area CELL. A contact may not be formed on the upper metal pattern 892 formed in the uppermost metal layer of the cell area CELL.

As described above, according to the one or more of the embodiments, the ECC decoder 122 and the memory controller 100 may significantly improve the correction ability of ECC by preemptively performing SD decoding on SD data that is obtained by a coarse SD read command.

According to an embodiment of the invention, an error correction code (ECC) decoder comprises a coarse soft decision (SD) setting circuit configured to store a parameter value of a decoding operation, which is based on a first piece of SD data obtained in response to a coarse SD read command, a fine SD setting circuit configured to store a parameter value of a decoding operation, which is based on a second piece of SD data obtained in response to a fine SD read command, and a decoding circuit configured to perform iterative decoding based on at least one of the first piece of SD data and the second piece of SD data.

Effects obtainable by the embodiments described herein are not limited to the effects mentioned above, and those of ordinary skill in the art may explicitly derive and understand other effects from the descriptions of the embodiments. That is, unintended effects of the embodiments may also be derived from the embodiments by those of ordinary skill in the art.

While the inventive concept has been particularly shown and described with reference to embodiments thereof, it will be understood that various changes in form and details may be made therein without departing from the spirit and scope of the following claims.

What is claimed is:

1. A memory controller, comprising:
a processor having a decoding-mode determination circuit therein, which is configured to: (i) receive information on a lifespan or retention of a memory device, and (ii) based on the received information, determine one of a first operation mode and a second operation mode as an operation mode, said processor configured to transmit to the memory device, a coarse soft decision (SD) read command for obtaining hard decision (HD) data and a first piece of SD data during a time period of a single read, or a fine SD read command for obtaining a second piece of SD data from a plurality of reads; and
an error correction code (ECC) decoder including: (i) a coarse SD setting circuit configured to store a parameter value of a decoding operation, which is based on the first piece of SD data obtained by the coarse SD read command, (ii) a fine SD setting circuit configured to store a parameter value of a decoding operation, which is based on the second piece of SD data obtained by the fine SD read command, and (iii) a decoding circuit configured to perform iterative decoding based on the first piece of SD data or the second piece of SD data;
wherein the first operation mode corresponds to a mode for sequentially transmitting the coarse SD read command and the fine SD read command to the memory device;
wherein the second operation mode corresponds to a mode for transmitting the fine SD read command to the memory device, and
wherein the decoding-mode determination circuit is further based on a syndrome value indicating a number of non-zero bits included in results of an operation on previous hard decision decoding results and parity check matrix.

2. The memory controller of claim 1, wherein the decoding circuit is configured to perform a low-density parity-check (LDPC).

3. The memory controller of claim 1, wherein the information on the lifespan or retention of the memory device includes at least information about the number of program/erase (P/E) cycles, a syndrome value of ECC decoding results, or information about the number of reads.

4. The memory controller of claim 3, wherein the decoding-mode determination circuit is configured to select the second operation mode when the number of P/E cycles is greater than a threshold count, or the first operation mode when the number of P/E cycles is less than the threshold count.

5. The memory controller of claim 3, wherein the decoding-mode determination circuit is configured to select the second operation mode when the syndrome value is greater than a threshold value, or the first operation mode when the syndrome value is less than the threshold value.

6. The memory controller of claim 1, wherein the first piece of SD data is less accurate than the second piece of SD data.

7. The memory controller of claim 1, wherein the ECC decoder further comprises a mode selection circuit configured to: (i) receive a control signal indicating the operation mode from the decoding-mode determination circuit, and (ii) selectively activate the coarse SD setting circuit or the fine SD setting circuit according to the operation mode indicated by the control signal.

8. The memory controller of claim 1, wherein a first maximum repetition number corresponding to the parameter value of the decoding operation based on the first piece of SD data is less than a second maximum repetition number corresponding to the parameter value of the decoding operation based on the second piece of SD data.

9. The memory controller of claim 1, wherein the ECC decoder is configured to successively perform the decoding operation based on the second piece of SD data, in response to a failure of the decoding operation based on the first piece of SD data.

10. The memory controller of claim 1, wherein an operating time of the coarse SD read command is equal to an operating time of a single read command; and wherein an operating time of the fine SD read command is equal to an operating time of a plurality of read commands.

11. An error correction code (ECC) decoder, comprising:
a coarse soft decision (SD) setting circuit configured to store a parameter value of a decoding operation that is based on a first piece of SD data obtained in response to a coarse SD read command;
a fine SD setting circuit configured to store a parameter value of a decoding operation that is based on a second piece of SD data obtained in response to a fine SD read command;
a mode selection circuit configured to receive a control signal indicating an operation mode, and selectively activate the coarse SD setting circuit or the fine SD setting circuit according to the operation mode indicated by the control signal; and
a low-density parity-check (LDPC) decoding circuit configured to perform iterative decoding based on the first piece of SD data or the second piece of SD data,
wherein the operation mode is determined based on a syndrome value indicating a number of non-zero bits included in results of an operation on previous hard decision (HD) decoding results and a parity check matrix.

12. The ECC decoder of claim 11, wherein the operation mode includes: (i) a first operation mode for preemptively performing the decoding operation that is based on the first piece of SD data, and then performing the decoding operation that is based on the second piece of SD data, and (ii) a second operation mode for performing only the decoding operation that is based on the second piece of SD data.

13. The ECC decoder of claim 11, wherein the mode selection circuit is further configured to: (i) activate the coarse SD setting circuit and the fine SD setting circuit in response to the control signal indicating a first operation mode, and (ii) deactivate the coarse SD setting circuit in response to the control signal indicating a second operation mode.

14. The ECC decoder of claim 11, wherein a first maximum repetition number corresponding to the parameter value of the decoding operation based on the first piece of SD data is less than a second maximum repetition number corresponding to the parameter value of the decoding operation based on the second piece of SD data.

15. A memory system, comprising:
a memory device having an array of memory cells therein; and
a memory controller comprising:
a processor having a decoding-mode determination circuit therein, which is configured to receive information on a lifespan or retention of a memory device and, based on the received information, determine one of a first operation mode and a second operation mode as an operation mode; and an error correction code (ECC) decoder including: (i) a coarse soft decision (SD) setting circuit configured to store a parameter value of a decoding operation, which is based on a first piece of SD data obtained by a coarse SD read command, (ii) a fine SD setting circuit configured to store a parameter value of a decoding operation, which is based on a second piece of SD data obtained by a fine SD read command, and (iii) a decoding circuit configured to perform iterative decoding based on the first piece of SD data or the second piece of SD data;

wherein the first operation mode corresponds to a mode for sequentially transmitting the coarse SD read command and the fine SD read command to the memory device;

wherein the second operation mode corresponds to a mode for transmitting the fine SD read command to the memory device, and wherein the decoding-mode determination circuit is further based on a syndrome value indicating a number of non-zero bits included in results of an operation on previous hard decision decoding results and a parity check matrix.

16. The memory system of claim 15, wherein the processor is configured to transmit, to the memory device, the coarse SD read command for obtaining hard decision (HD) data and the first piece of SD data during a time period of a single read, or the fine SD read command for obtaining the second piece of SD data through a plurality of reads.

17. The memory system of claim 15, wherein the information on the lifespan or retention of the memory device includes information about the number of program/erase (P/E) cycles, a syndrome value of ECC decoding results, and information about the number of reads; and wherein the decoding-mode determination circuit is configured to select the second operation mode when the number of P/E cycles is greater than a threshold count or the first operation mode when the number of P/E cycles is less than the threshold count.

18. The memory system of claim 15, wherein a first maximum repetition number corresponding to the parameter value of the decoding operation based on the first piece of SD data is less than a second maximum repetition number corresponding to the parameter value of the decoding operation based on the second piece of SD data.

19. The memory system of claim 15, wherein the ECC decoder is configured to successively perform the decoding operation based on the second piece of SD data, in response to a failure of the decoding operation based on the first piece of SD data.

20. The memory system of claim 15, wherein the first piece of SD data is less accurate than the second piece of SD data.

* * * * *